(12) United States Patent
Shiomi

(10) Patent No.: US 7,830,558 B2
(45) Date of Patent: Nov. 9, 2010

(54) DIGITAL CAMERA AND CONTROLLING METHOD THEREFOR

(75) Inventor: Yasuhiko Shiomi, Itabashi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 11/733,097

(22) Filed: Apr. 9, 2007

(65) Prior Publication Data

US 2007/0242313 A1     Oct. 18, 2007

(30) Foreign Application Priority Data

Apr. 11, 2006    (JP)    ............................... 2006-108794

(51) Int. Cl.
- H04N 1/00    (2006.01)
- G06F 11/00    (2006.01)
- H04M 11/00    (2006.01)

(52) U.S. Cl. .................. 358/405; 358/426.03; 358/434; 358/435; 379/100.06; 370/252

(58) Field of Classification Search ................. 358/474, 358/475, 448, 443, 400, 401, 434, 435, 407; 370/252, 315, 230.1, 333; 455/550.1, 419, 455/420, 411, 410, 63.11, 67.1, 435.2, 452.2, 455/453, 504, 506

See application file for complete search history.

(56) References Cited

U.S. PATENT DOCUMENTS

| 6,686,958 | B1 * | 2/2004 | Watanabe et al. | 348/231.1 |
| 7,012,902 | B2 * | 3/2006 | Omi et al. | 370/310.1 |
| 7,031,254 | B2 * | 4/2006 | Abraham et al. | 370/229 |
| 7,317,930 | B2 * | 1/2008 | Ikeda | 455/500 |
| 7,327,988 | B2 * | 2/2008 | Grabon et al. | 455/73 |
| 7,474,749 | B2 * | 1/2009 | Mauro | 380/255 |
| 7,511,614 | B2 * | 3/2009 | Stilp et al. | 340/541 |
| 7,529,548 | B2 * | 5/2009 | Sebastian | 455/452.1 |
| 7,702,323 | B2 * | 4/2010 | Sakamoto | 455/420 |
| 7,720,000 | B2 * | 5/2010 | Yoshida et al. | 370/252 |

FOREIGN PATENT DOCUMENTS

| JP | 2002-320136 A | 10/2002 |
| JP | 2003-60964 A | 2/2003 |

* cited by examiner

Primary Examiner—Jerome Grant, II
(74) Attorney, Agent, or Firm—Canon U.S.A., Inc., IP Division

(57) ABSTRACT

In a digital camera performing wireless communication, the communication speed of the wireless communication is changed according to the state of the wireless communication, and a clock frequency associated with producing packet data according to the changed communication speed is also changed.

15 Claims, 8 Drawing Sheets

FIG.3A IMAGE PROCESS CONTROLLING UNIT → NETWORK PROCESS CONTROLLING UNIT (IN THE CASE OF A HIGH LINK SPEED)
FIG.3B IMAGE PROCESS CONTROLLING UNIT → NETWORK PROCESS CONTROLLING UNIT (IN THE CASE OF A LOW LINK SPEED)

DIGITAL CAMERA AND CONTROLLING METHOD THEREFOR

BACKGROUND OF THE INVENTION

1. Field of the Invention

The present invention relates to a digital camera for wirelessly transmitting photo-taken image data to an external device, and a controlling method therefor.

2. Description of the Related Art

Conventionally, when an image captured with a digital camera is transmitted to an external device using a wireless transmission system such as a wireless local area network (LAN), image data has been transferred by a method as illustrated in FIG. 7.

In FIG. 7, an image signal obtained by shooting a subject with an image sensor 100, such as a CCD, is temporarily stored in an internal memory 104 via an image processing unit 101.

Then, the image processing unit 101 reads out the image signal stored in the internal memory 104 to carry out a predetermined image process (matrix process→γ conversion→JPEG conversion). The image data subjected to the image process is recorded from the internal memory 104 to an external storage medium such as a memory card 105 attached to a digital camera (or they can be recorded in a storage medium housed inside the digital camera).

When the image data subjected to the image process is transferred to an external device using a wireless transmission system such as a wireless LAN, the image processing unit 101 reads out the image data obtained by the image process which is stored in the internal memory 104, or the image data stored in the memory card 105. Then, it transfers the data to a network processing unit 102. At the network processing unit 102, the protocol conversion, such as the conversion to the transmission control protocol/internet protocol (TCP/IP), is carried out to transfer the image data to the external device.

The image processing unit 101 and the network processing unit 102 can be formed integrally as a data processing system B. The network processing unit 102 or the data processing system B including the image processing unit 101 and the network processing unit 102 is connected with an oscillation circuit 103 configured to determine the operation frequency thereof. The oscillation circuit 103 configured to supply a clock signal to the network processing unit 102 or the data processing system B determines the optimum operation frequency to achieve the performance of the network processing unit B and the image processing unit.

The network processing unit 102 converts the data into protocol data according to the transfer method (i.e., packet) and transfers the data to a wireless communication unit 106 to carry out the radio frequency (RF) conversion for the wireless transmission at the wireless communication unit 106.

In the wireless communication unit 106, first the baseband process is carried out by the primary modulation operation, and then, the RF process for performing conversion to the frequency band of the wireless transmission (for example, in the case of the IEEE 802.11b/g, 2.4 GHz, and in the case of the IEEE 802.11a, 5 GHz)) is executed. Thereafter, it is converted to the final analog data via an output circuit (not shown), such as a power amplifier, to output an electric wave having a predetermined frequency band range to the outside via an antenna 107.

On the data receiving side, the electric wave transmitted from the wireless communication unit 106 of the digital camera is received at a receiving antenna 108.

In a wireless communication unit 109, first, the signal is received by a receiving amplifier to carry out RF conversion, which is inverse of the one performed at the time of the transmission. Next, the signal is converted to a packet data by the inverse modulation to the one performed at the time of the transmission. The converted packet data is transferred from the wireless communication unit 109 to an external device 110 serving as the host appliance, such as a personal computer (PC). The transferred data is stored as image data in a memory unit provided inside or outside the external device 110. The wireless communication unit 109 can be housed in the external device 110.

The data received by the wireless communication unit 109 is demodulated to the original image data, which is displayed on the monitor screen of the external device 110 in the order the images were taken, such as the first frame image, the second frame image, etc. For example, thumbnail images of the captured images are displayed on divided areas of the screen as illustrated on a monitor display image 111.

The wireless communication unit 106 includes a module for both transmission and reception. The module includes a processing unit configured to convert the image data to be transmitted into wireless RF data, and a data processing unit configured to receive wireless data from an external device which converts the received data into predetermined format data.

In the case of such a system in which an image is transmitted between a digital camera and an external device using the conventional wireless communication module, a mechanism is incorporated for reciprocally monitoring a state of the electric wave or the packet at any time on the transmitting and receiving sides. For example, in the case where a state of the electric wave received on the receiving side is poor, or errors of the received data are large in number (the data includes also data for error detection), the transmission and reception can be performed smoothly by switching the primary modulation method.

In general, as the method for the primary modulation, a digital modulation system such as phase shift keying (PSK) (QPSK, 8PSK) and quadrature amplitude modulation (QAM) (16QAM, 64QAM) is used. In such a modulation system, the transmission efficiency is improved by using the multi-value process. Therefore, the larger transmission data amount per one wavelength, the higher transmission speed.

According to the transmission system such as the wireless LAN, the communication speed can be changed by switching the modulation method. However, the processing of an image processing unit or a network processing unit of a digital camera is done at a constant operation frequency regardless of the operation state of the wireless communication unit. In such a case, a mechanism has not been considered that switches the control depending on information received from the wireless controlling unit that changes at any time.

Therefore, even in the case where the communication speed of the wireless communication unit is changed according to the state of the electric wave of the wireless communication, the processing speed (process clock frequency) of the processor that executes the network process has always been constant. Since the processor is always operated in a state that achieves the maximum performance, that is, at the highest frequency, the system as a whole unnecessarily consumes the energy.

For devices that are battery driven, such as a digital camera, such an operation is degrades performance of the device. For example, in the case of a digital camera, the number of photographs that can be taken and the number of wireless transmissions that can be performed are affected.

Japanese Patent Application Laid-Open No. 2002-320136 discusses a technique in which the driving frequency of the central processing unit (CPU) in a digital camera connected with an external appliance via a universal serial bus (USB) is changed according to the speed of the USB communication. However, in general, in the wired connection with a USB or an IEEE 1394, unless the connection state of the connected appliance (the order of the connection and the connection form which are named as topology) is changed, the communication speed stays constant. Therefore, after the connection state is initially detected, the communication speed is constant so that the driving frequency of the CPU of the digital camera is maintained constant as well.

On the other hand, in the case of a digital camera which is wirelessly connected, the state of electric wave changes at any given time. Therefore, when a process is operated according to the communication speed at the time of the connection, if the situation of the electric wave changes after establishing the connection, an optimum operation cannot be performed. For example, if an operation is started in maximum performance set immediately after establishing the connection and then the communication speed is lowered, energy is unnecessarily consumed in the whole system. On the other hand, if the communication speed is increased after starting the connection, the process cannot keep up with the increased speed and cannot obtain sufficient performance at the communication speed set at the time of starting the connection.

SUMMARY OF THE INVENTION

The present invention is directed to provide a wireless digital camera capable of optimizing its operation by finely performing control in consideration of the electric wave state and the process state that change at any given time.

According to an aspect of the present invention a digital camera includes an image sensing unit configured to shoot a subject and output an image signal, an image processing unit configured to apply an image process to the image signal to produce image data, an image recording unit configured to record the image data in a storage medium, a network processing unit configured to convert the image data into packet data according to a transfer method to transfer the image data to an external device, a wireless controlling unit configured to control wireless communication with the external device to wirelessly transfer the packet data, a communication speed controlling unit configured to change a communication speed of the wireless communication, and a process speed controlling unit configured to change a process speed of the network processing unit according to the communication speed changed by the communication speed controlling unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are diagrams for illustrating the flow of the real data according to an embodiment of the present invention.

DETAILED DESCRIPTION OF THE EMBODIMENTS

Various exemplary embodiments, features, and aspects of the invention will be described in detail below with reference to the drawings.

Figure 1:
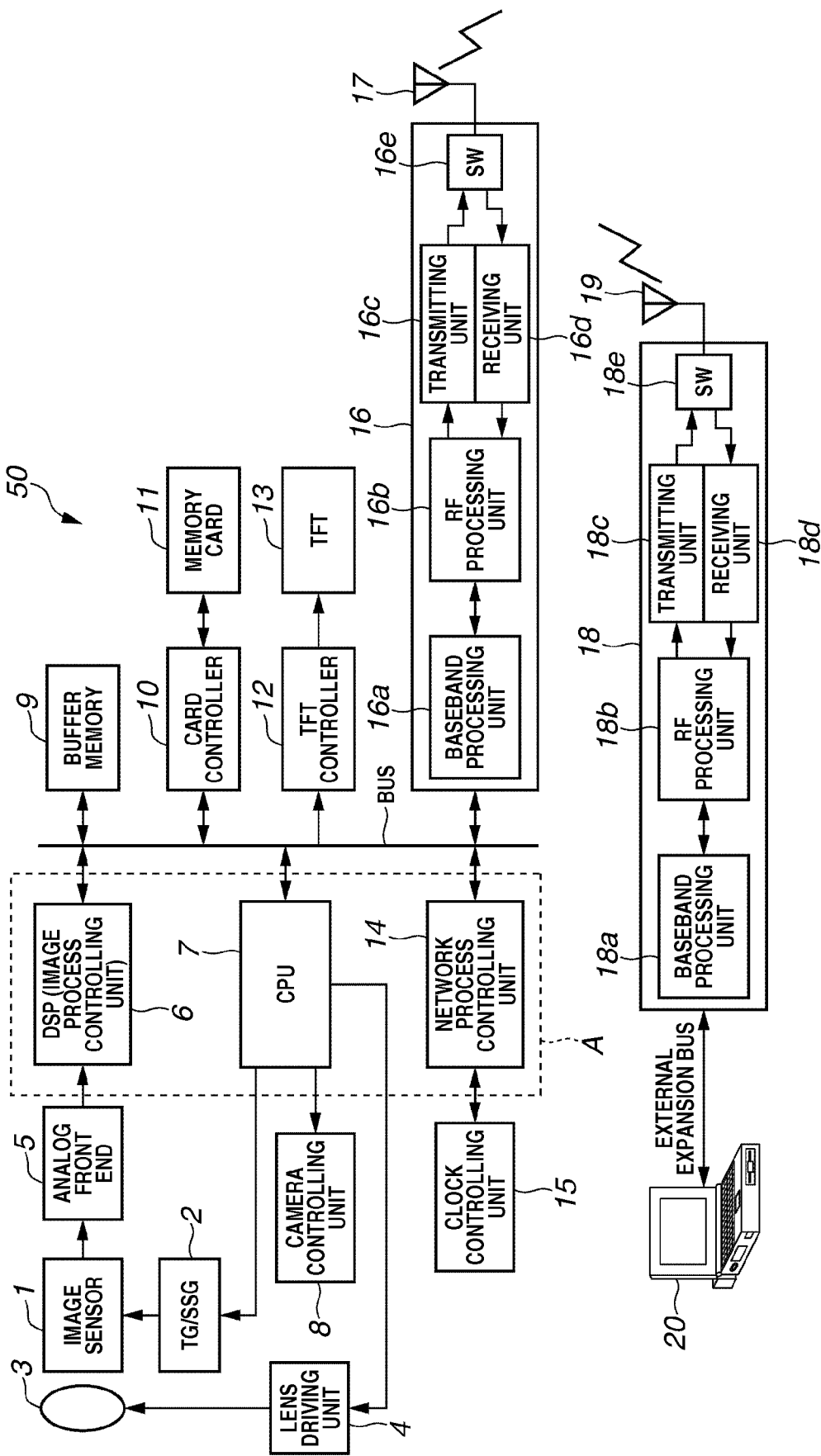
FIG. 1 is a diagram illustrating a configuration of a system according to an embodiment of the present invention.

FIG. 1 is a block diagram showing a configuration of a system according to an embodiment of the present invention. The system includes a digital camera 50, a wireless communication unit 18, and an external device 20. The digital camera 50 houses a wireless communication unit 16. The external device 20 is connected to the wireless communication unit 18. The wireless communication unit 18 can be housed in the external device 20.

In the digital camera 50, a CPU 7 detects a command input by an operation switch (not shown). Then, the CPU 7 supplies power to the other components/units of the digital camera 50, performs various kinds of settings, and controls the other components/units. The process of the image sensing system is controlled by a camera control unit 8.

Based on the signal from the CPU 7, a lens driving unit 4 carries out the auto focus (AF) and the zoom operation of the lens 3 to focus a subject image on an image sensor 1 such as a charge-coupled device (CCD) and a complementary metal-oxide semiconductor (CMOS) sensor. A signal output from the image sensor 1 is processed at an analog front end 5, and each pixel is subjected to correlated double sampling, gain setting, analog-to-digital (AD) conversion, or the like to be converted to a predetermined digital image signal.

The image sensor 1 generates an output signal based on a signal from a timing generator (TG/SSG) 2 that determines the driving timing of the entire digital camera 50.

A digital image signal from the analog front end 5 is input to an image process controlling unit (DSP) 6 that performs the signal process. The DSP 6 corrects deterioration of optical image generated by a combination of the image sensor 1 and the lens 3. Then, the signal is input to a color interpolation block inside the DSP 6. By the color interpolation process, the data is converted to data of three planes of RGB from the data of the Bayer arrangement.

Subsequent to the color interpolation process, a matrix correction is carried out. A desired color is output from the spectral characteristics of the color filter inherent to the sensor in the matrix correcting block in the DSP 6, that is, RGB→RGB conversion is performed.

Then, the signal is input to a γ conversion block in the DSP 6. The data width of the digital data in the analog front end circuit 5 is converted from 12 bits to 8 bits. The γ conversion is carried out for the signal to be within a predetermined dynamic range.

Furthermore, the signal is input to an RGB→YCrCb conversion block in the DSP 6. After the color conversion process from RGB to YCrCb is performed, the signal is input to a fake color removing block in the DSP 6, where fake color removing process is carried out with respect to the CrCb component.

Here, as the fake color removing process, a median filter (intermediate value filter) can be used to avoid generation of color moire. The color moire is generated due to the relationship between the sampling frequency and the image frequency.

Furthermore, the image signal is input to an edge stressing block in the DSP 6, in which an edge stressing process is carried out to raise the gain in the vicinity of the intermediate frequency of the image so that the process of the outline stressing of the image is performed. Then, the signal is input to a resolution converting block in the DSP 6 so as to be re-sized to the preset image size.

Here, in the case of re-sizing the signal to the preset image size, a thinning process is carried out after executing a filter process in the horizontal and vertical directions.

These image processes are carried out successively per one frame, and the results are stored temporarily in the buffer memory 9.

The above-described operation is a color process with respect to an image signal captured by the image sensor 1. The data subjected to the color process which is temporarily stored in the buffer memory 9 is again input to the DSP 6 to carry out a compression process.

As the compression process, a lossy type JPEG compression process based on an ordinary discrete cosine transform (DCT) conversion, and a lossless type compression process are commonly used.

First, the compression process in which the lossy type JPEG compression process based on an ordinary DCT conversion is performed will be described. The data subjected to the color process in the buffer memory 9 which stores the results of the color process is read into the DPS 6. The image data is input to a raster block conversion block in the DPS 6 to convert the image data into a block of a two dimensional unit. The block consists of 8 pixels in the horizontal direction and 8 pixels in the vertical direction.

Then, the data is input into the DCT conversion block in the DSP 6 to carry out the DCT conversion into 8×8 data per a frequency component in a 8×8 block unit. The coefficient from the low frequency component to the high frequency component is calculated in the two dimensional unit.

Then, the signal is input into a quantization block in the DSP 6 and quantization is carried out with respect to the coefficient value calculated by the DCT conversion. The quantization is carried out by the division for each coefficient, based on the value of a quantization table including preset values.

Furthermore, while reading out the data in a predetermined scanning direction, the quantization results are input into a Huffman encoding block in the DSP 6. Then, entropy encoding is carried out along the Huffman table including preset values.

The data thus compressed is written back again into a predetermined area in the buffer memory 9, and the series of the compression process ends.

Next, the lossless type compression method will be described. There is the lossless type compression method based on the differential pulse code modulation (DPCM). In this case, the data subjected to the color process in the buffer memory 9, which stores the results of the color process, is read into the DSP 6. The data is input into the DPCM conversion block in the DSP 6 to convert the image data into the differential data with respect to the predicted value.

Then, while reading out the data subjected to the DPCM conversion, the data is input into the Huffman encoding block in the DSP 6, and entropy encoding is carried out here along the Huffman table including preset values.

The data thus compressed is written back again into a predetermined area in the buffer memory 9, and the series of the compression process ends.

A card controller 10 stores in a memory card 11 (in general, a nonvolatile memory such as a flash memory is used) the image data subjected to the predetermined color process and the compression process based on a predetermined compression format in the DPS 6 by the above-described method.

Further, in the case of displaying captured image data, the compressed image data stored in the memory card 11 is expanded to the data per ordinary captured pixel through the JPEG process block in the DSP 6, and the expansion results are transferred to the buffer memory 9. The transferred image data is converted to image data for display by the thin-film transistor (TFT) controller 12 so that the captured images can be displayed on the TFT display 13.

Further, a thumbnail image can be produced simultaneously with the image process in the DSP 6 and stored in the memory card 11. The thumbnail image data can be read out to display the captured image on the TFT display 13.

With respect to the control of the entire digital camera 50, a command is executed by the CPU 7 according to a program code stored in a program memory (not shown) connected to the CPU 7. The CPU 7 controls the lens driving unit 4 to drive and controls the lens 3 (focus drive or diaphragm drive control in the lens 3), or controls the shutter controlling unit (i.e., the camera controlling unit 8) to carry out the shutter exposure. Furthermore, the CPU 7 performs control to record the image data in the memory card 11 by adding header information or information such as the photograph conditions to the image data.

Further, the image data subjected to the image process is input to the network process controlling unit 14 so that the image data is converted to the packet data suitable for the protocol on the network. Then, the image data can be directly transferred to an external network by wire or wireless communication. In such a case, if the image data is transferred to the external device while capturing an image, the image process is applied to the image data in the DSP 6. The image data to which the image process is applied is stored in the buffer memory 9 in the memory card 11 and also transmitted to the network process controlling unit 14. On the other hand, in the case of transmitting the captured image stored in the memory card 11 to the external device after finishing shooting, the image data is read out from the memory card 11 by the card controller 10 and transferred to the network process controlling unit 14 via the DSP 6.

In general, when the data is directly transferred to the external appliance via the network after the image is processed, the packet data is converted using the protocol such as TCP/IP. In the case of executing the process at a high speed, the network process controlling unit dedicated for the packet data conversion can be used. In such a case, the clock controlling unit 15 supplies a clock having a predetermined operation frequency to drive the network process controlling unit 14 at a predetermined operation speed.

As illustrated by the dotted line A, the DSP 6, the CPU 7 and the network process controlling unit 14 can be integrally formed. The above-described protocol conversion is carried out in the software process at the CPU 7.

Next, a configuration of the wireless system using a digital camera 50 will be described.

The wireless communication unit 16 illustrated in FIG. 1 is connected on the same bus as the DSP 6, the CPU 7, and the network process controlling unit 14. The image data to be transmitted and various data received from the external device 20 are transferred via the bus.

The wireless communication unit 16 includes a baseband processing unit 16a, an RF processing unit 16b, a transmitting unit 16c, a receiving unit 16d, and an antenna switch 16e.

The baseband processing unit 16a carries out a process such that transmitting data such as the image data and the command data have a signal-to-noise (S/N) ratio optimum for the transmission. For example, the primary modulation (e.g., orthogonal frequency division multiplexing (OFDM) modulation used by the IEEE 802.11a), or the access control is performed to determine the transmission and receipt timing with the other wireless appliances. The RF processing unit 16b converts the data to a high frequency signal of a predetermined wireless frequency band. The transmitting unit 16c includes a power amplifier and outputs a wireless signal converted by the RF processing unit 16b as a transmission output. The receiving unit 16d includes a low noise amplifier and receives a wireless signal from the outside with a high sensitivity. The antenna switch 16e switches between a transmitting signal and a receiving signal for the antenna 17. The antenna switch 16e is connected with an external antenna 17 to transmit and receive a wireless signal.

The configuration of the digital camera 50 having a wireless communication unit housed in the digital camera 50 main body or connected externally has been described above. Further, an external appliance configured to exchange the image data with the digital camera 50 has a similar wireless communication unit.

The external appliance 20 serving as a host appliance to a PC is connected with a wireless communication unit 18 similar to the wireless communication unit 16 by the external expansion bus. The wireless communication unit 18 includes a baseband processing unit 18a, an RF processing unit 18b, a transmitting unit 18c, a receiving unit 18d and an antenna switch 18e. The functions, operations and processes of these units are the same as the baseband processing unit 16a, the RF processing unit 16b, the transmitting unit 16c, the receiving unit 16d, and the antenna switch 16e of the wireless communication unit 16.

Further, the antenna switch 18e is connected to an external antenna 19 to transmit and receive a wireless signal.

Accordingly, the wireless communication unit 16 on the digital camera 50 side and the wireless communication unit 18 on the external device 20 side have the same configuration. The bi-directional data transmission can be made while reciprocally switching between the transmission and receipt mode at any time.

Figure 2:
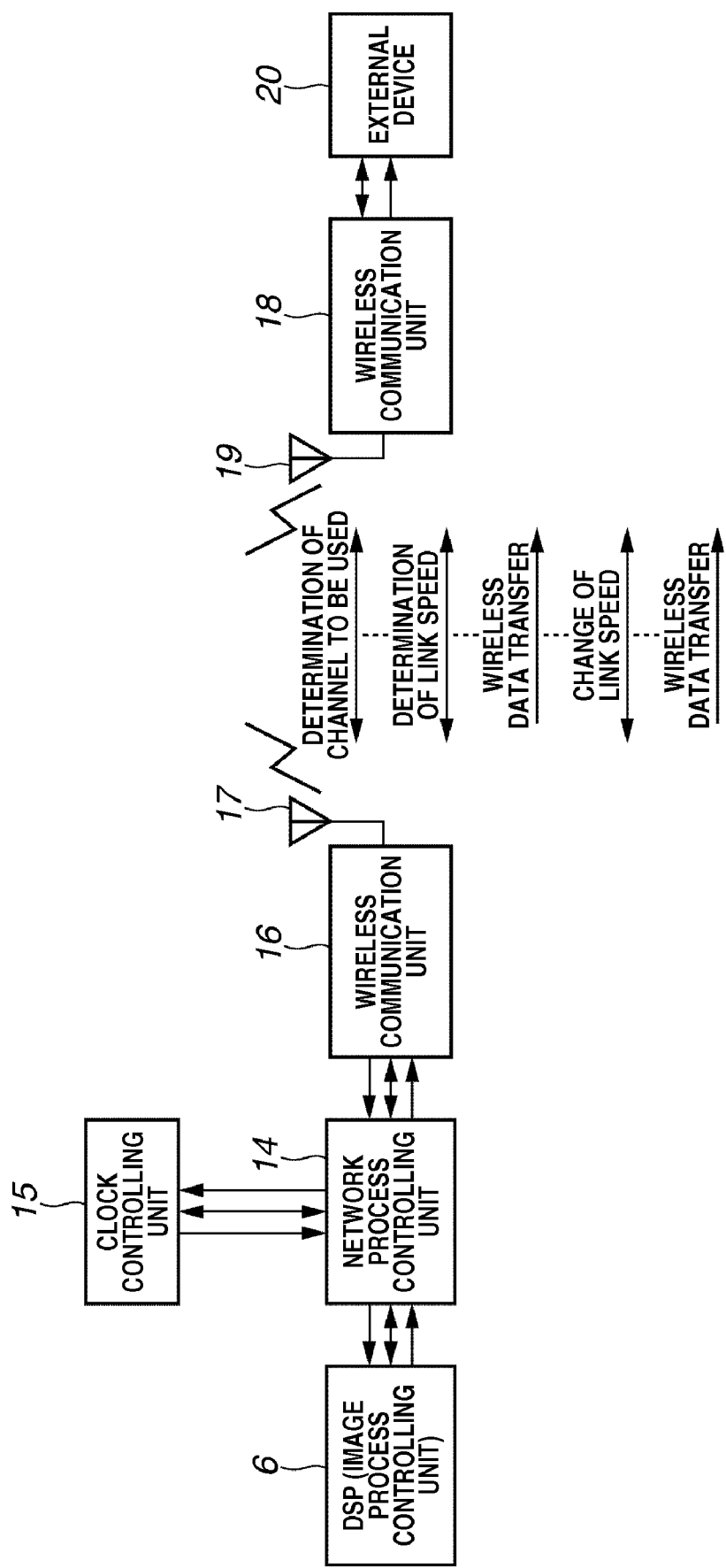
FIG. 2 is a diagram for illustrating the detailed operation of a system according to an embodiment of the present invention.

Next, the image data transmitting method will be described with reference to FIG. 2.

First, the wireless communication unit 16 on the digital camera 50 main body side starts the wireless connection via the antenna 17 with the wireless communication unit 18 of the external device 20 operating as the communication counterpart via the antenna 19.

The wireless communication units 16 and 18 determine the channel for the reciprocal communication at the time of starting the connection. In general, according to a wireless LAN of 802.11b or 802.11g, a 2.4 GHz frequency band is divided to 1 to 14 channels (in North America, 1 to 13 channels). Therefore, the appliances that are going to communicate enter into negotiation to match the channel used in the initial stage. In general, by scanning channels, the channel with the best sensitivity is determined as the channel to be used.

Next, the communication speed for the packet transfer by the wireless connection will be determined. The wireless communication units 16 and 18 determine the communication speed while performing control to maintain the optimum link state by changing the modulation method according to the wireless communication state. The information illustrating the wireless communication state for determining the wireless communication speed includes, for example, information about the wireless communication electric wave state, information whether the receiving sensitivity is high or low, and whether the error ratio of the transmission data is high or low.

For example, in the case where the receiving sensitivity is high, the error ratio is low. In such a case, if a higher order modulation system (e.g., by the 64QAM (quadrature amplitude modulation), data of 5 bits can be transferred by a carrier wave) is adopted, communication at a higher communication speed is possible (in the case of the IEEE 802.11g, it is 54 Mbps at most).

On the other hand, in the case where the receiving sensitivity is low, the error ratio is high. In such a case, by shifting to a lower order modulation system (for example, the BPSK (binary phase shift keying) capable of transferring data of 1 bit by a carrier wave), control is performed to maintain the link state in order to improve the S/N ratio as much as possible. However, in this case, the communication speed is extremely low i.e., at 1.1 Mbps or 2.2 Mbps level.

After determining the communication speed of the wireless connection as described above, information about the communication speed is provided by the wireless communication unit 16 to the network process controlling unit 14. The network process controlling unit 14 compares the notified communication speed and the process speed of the network process controlling unit 14 and determines whether the network process speed is higher or lower than the communication speed.

For example, if it is determined that due to an extremely high communication speed of the wireless communication unit 16, the process cannot be achieved with the process speed of the network process controlling unit 14, the network process controlling unit 14 notifies the clock controlling unit 15 that the clock is changed to a higher speed. Upon receiving the notification, the clock controlling unit 15 changes the system clock frequency that it generates to a higher speed.

Following the change of the system clock frequency, the network process controlling unit 14 sends to the DSP 6 the operation frequency change notification indicating the changeover of the system clock frequency. The DSP 6 recognizes that the network process controlling unit 14 is capable of carrying out a predetermined protocol converting process at a high speed.

The DSP 6 thereby processes the image data stored in the buffer memory 9 or the memory card 11 at a high speed, and transfers the data to the network process controlling unit 14. Moreover, at the time the system clock frequency that is supplied to the network process controlling unit 14 and to the DSP 6, can be changed to a higher speed.

FIGS. 3A and 3B illustrate the flow of transferring the image data from the DSP 6 to the network process controlling unit 14. In the case where the communication speed is high, as illustrated in FIG. 3A, the images can be transferred continuously from the DSP 6 to the network process controlling unit 14.

In the network process controlling unit 14, after receiving the image data from the DSP 6, a predetermined protocol conversion is performed. Then, the converted data is transferred to the wireless communication unit 16 in a predetermined packet unit. The wireless communication unit 16 converts the data received from the network process controlling unit 14 into wireless data and transfers the converted data to the wireless communication unit 18 operating as the communication counterpart.

In the case where, due to an extremely low communication speed of the wireless communication unit 16, the process speed of the network process controlling unit 14 is too high compared with the communication speed, the network process controlling unit 14 notifies the clock controlling unit 15 to change over the clock to a lower speed. In response to the notification, the clock controlling unit 15 changes the system clock frequency to a lower speed (a lower frequency).

Following the change of the system clock frequency, the network process controlling unit 14 notifies the DSP 6 of the operation frequency change. The DSP 6 recognizes that the network process controlling unit 14 can carry out a protocol converting process only at an extremely low speed.

According to the change-over of the clock of the network process controlling unit 14 to a lower speed, the DSP 6 slowly reads out the image data stored in the buffer memory 9 or the memory card 11 and transfers the read data to the network process controlling unit 14. Further, at the time, the system clock frequency supplied to the network process controlling unit 14 and to the DSP 6 can be changed to a lower speed.

In the case where the communication speed is low, as illustrated in FIG. 3B, the image data is gradually transferred from the DSP 6 to the network process controlling unit 14. Accordingly, the network process controlling unit 14 can sufficiently carry out the process even with the low speed clock.

In the network process controlling unit 14, after receiving the image data, a predetermined protocol conversion is performed. The converted data is transferred to the wireless communication unit 16 in a predetermined packet unit, and further transferred as the wireless data to the wireless communication unit 18 of the external device operating as the communication counterpart.

Figure 4:
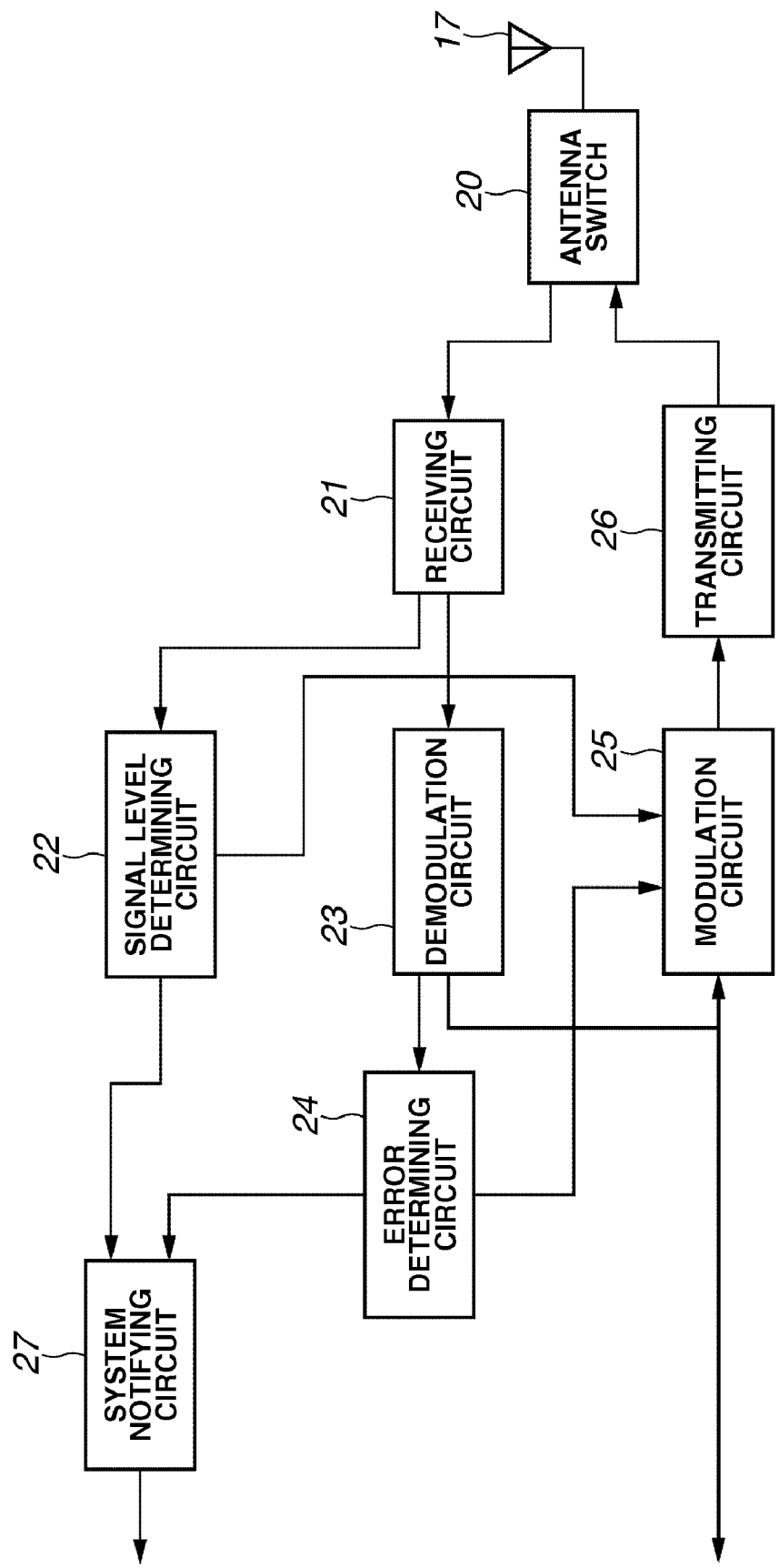
FIG. 4 is a diagram for illustrating an internal configuration of a wireless communication unit according to an embodiment of the present invention.

FIG. 4 illustrates the internal configuration of the wireless communication unit 16. The wireless communication unit 16 monitors the wireless communication state of the wireless communication unit 16 of the digital camera 50 and the wireless communication unit 18 on the external device 20 side. The wireless communication unit 16 changes at any given time the communication speed, and notifies the communication speed to the network process controlling unit 14.

First, when an electric wave is received via the antenna 17, the electric wave is input to the receiving circuit 21 via the antenna switch 20. The strength of the electric wave received by the receiving circuit 21 is determined by a signal level determining circuit 22, and it is determined whether the level of the received signal is high or low as described above.

If it is determined that the signal level is high, the signal level determining circuit 22 outputs a command to carry out a higher order modulation to the modulation circuit 25. If it is determined that the signal level is low, a command to carry out a lower order modulation is provided to the modulation circuit 25.

The signal received by the receiving circuit 21 is input to the demodulation circuit 23 and is returned to a predetermined digital signal. Since the digital signal includes a predetermined error detection code, the signal is input to the error determining circuit 24 to detect the error generation frequency.

If the error determining circuit 24 determines that the error generation frequency is high, a command to carry out a higher order modulation is output to the modulation circuit 25. If it is determined that the error generation frequency is low, a command to carry out a low order modulation is provided to the modulation circuit 25.

Furthermore, the output result of the signal level determining circuit 22 and the output result of the error determining circuit 24 are input to the system notifying circuit 27 to determine the final communication speed. Then, the communication speed is notified to the network process controlling unit 14.

The signal level determining circuit 22 and the error determining circuit 24 can operate one by one in response to a packet (which consists of predetermined plural bites as digital data), or can operate according to overall determination based on plural continuous packets. These operations can be changed over in the circuits.

By providing the real time determining mechanism as described above, the change of the electric wave state of the wireless transmission can be dealt almost instantly, which significantly contributes to energy saving.

In the above-described embodiment, change of the communication speed is notified to the network process controlling unit 14. The communication speed is compared with the process speed of the network process controlling unit 14 and the clock frequency of the network process controlling unit 14 is changed according to the comparison result. However, the change of the communication speed can be notified to the DSP 6 or the CPU 7 instead of the network process controlling unit 14. In response to the change of the communication speed, the CPU 7 can determine the change of the clock frequency and notify the clock frequency change to the clock controlling unit 15. Further, the communication speed in the above-described embodiment can either be an effective speed or a link speed.

Thus, while the communication speed changes according to the wireless communication speed, the clock frequency of the network process controlling unit 14 which produces the packet data can be changed according to the changed communication speed. Therefore, in the case where the wireless communication state is changed and the communication speed becomes higher, the image process and the packet process for the network transfer are executed at the maximally high speed so as to immediately transfer the images from the digital camera 50, thus realizing the high speed transfer. On the other hand, in the case where the wireless communication state is changed and the communication speed becomes lower, the image process and the packet process for the network transfer are executed at a low speed so that the internal power consumption can be reduced as much as possible.

Further, in the case of the wired connection, the communication speed is changed over when the topology change is detected. However, in the case of the wireless connection, the communication speed can change drastically according to the environmental change due to the nature of the electric wave. Therefore, the communication speed changes at any given time according to the strength of the electric wave so that it is required to detect the electric wave state and change the communication speed at any given time. By changing the process speed of the image process and the packet process for the network transfer according to the wireless communication speed that changes at any given time, optimum performance can be obtained.

Figure 5:
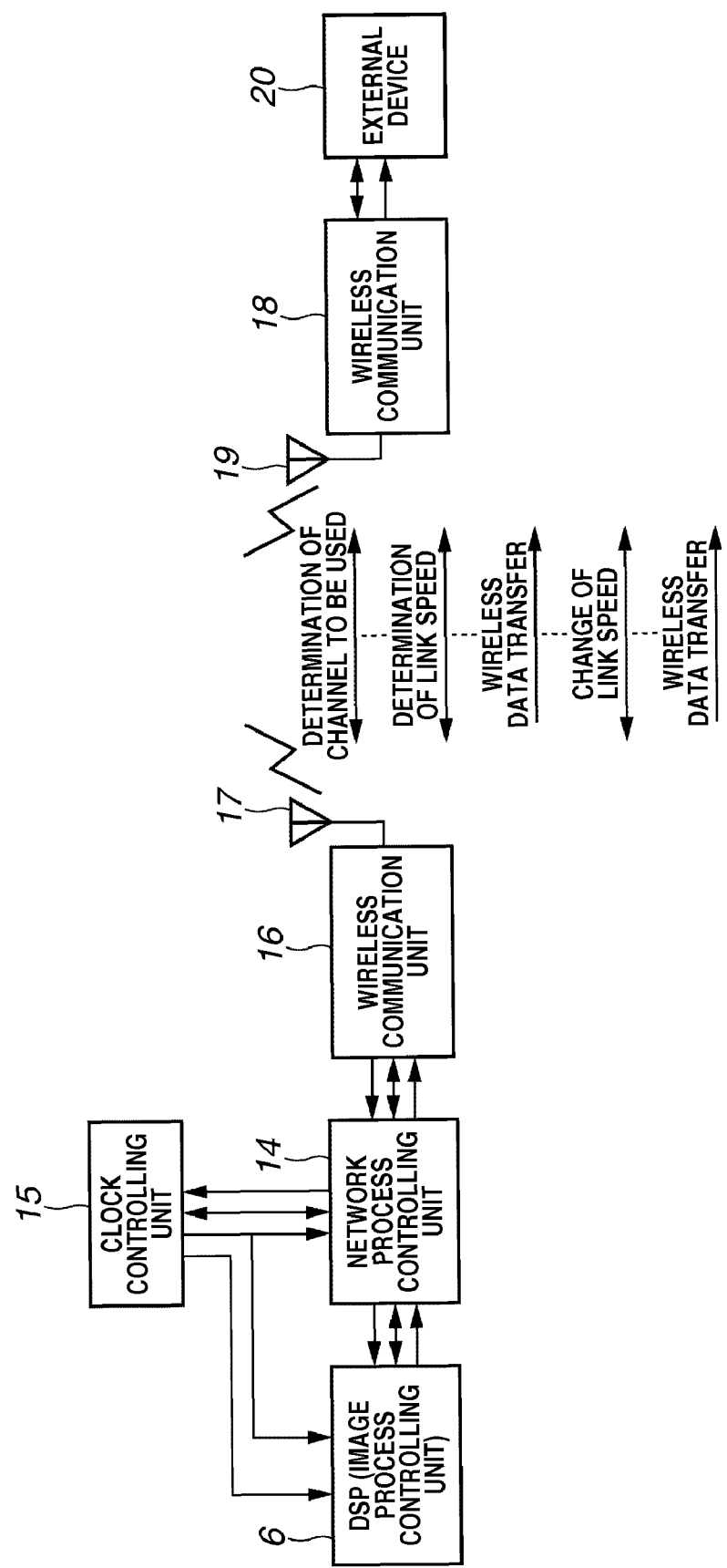
FIG. 5 is a diagram for illustrating a detailed operation of a system according to an embodiment of the present invention.

FIG. 5 illustrates another embodiment of the present invention of data transmission between a digital camera and an external device.

The basic operation in the present embodiment is the same as described in the previous embodiment. In the present embodiment, the communication speed detected by the wireless communication unit 16 is notified to the network process controlling unit 14. In the case where the communication speed is high, the network process controlling unit 14 sends a command to the clock controlling unit 15 to raise the system clock frequency. In the case where the communication speed is low, the network process controlling unit 14 sends a command to the clock controlling unit 15 to lower the system clock frequency.

The clock controlling unit 15 determines the frequency according to the command and changes the clock frequency which is supplied to the network process controlling unit 14 and the DSP 6.

In the present embodiment, according to the communication speed of the wireless communication unit 16, the system clock of the network process block and that of the image process controlling block of the digital camera itself change their frequency. Therefore, unnecessary energy consumption can further be prevented.

Figure 6:
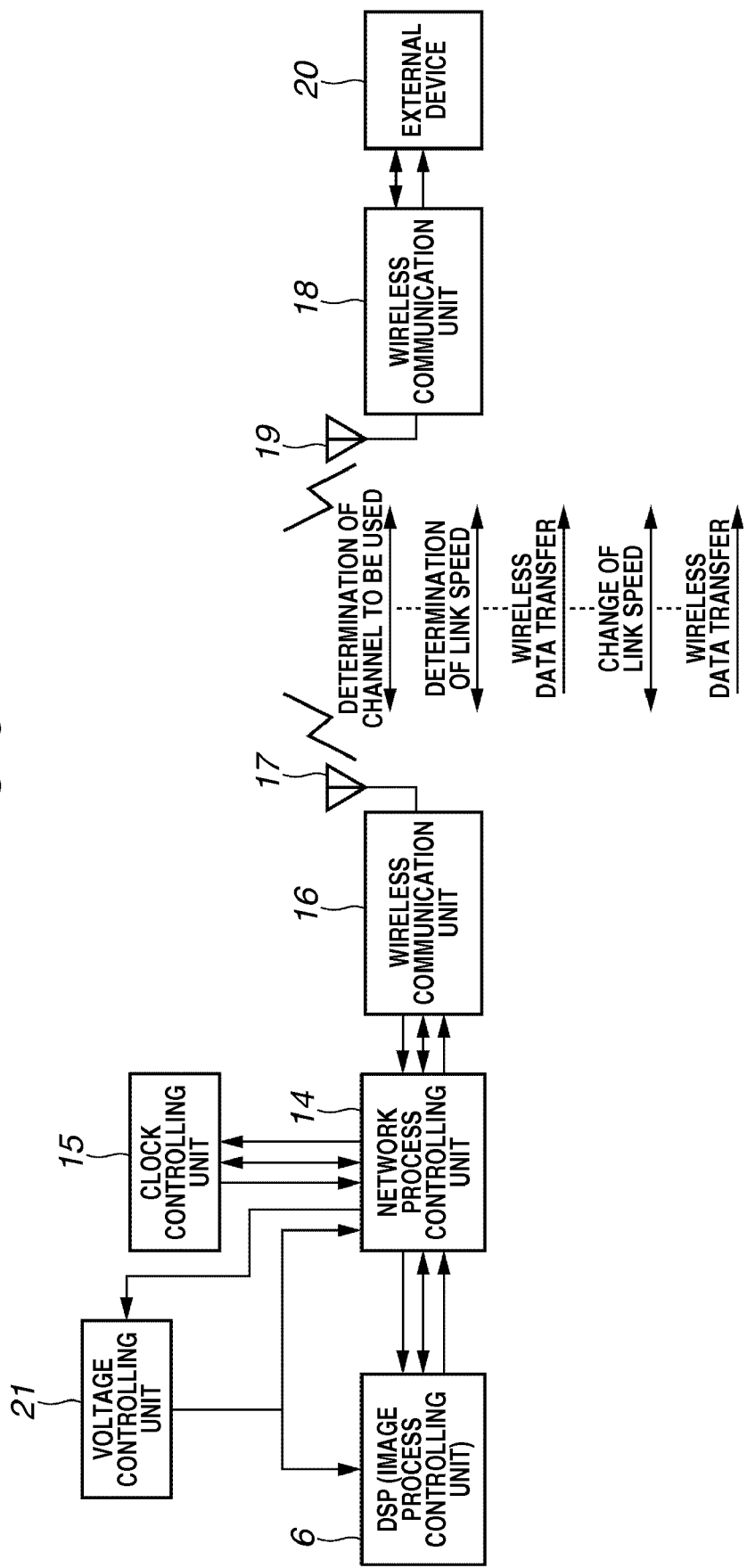
FIG. 6 is a diagram for illustrating a detailed operation of a system according to an embodiment of the present invention.
Figure 7:
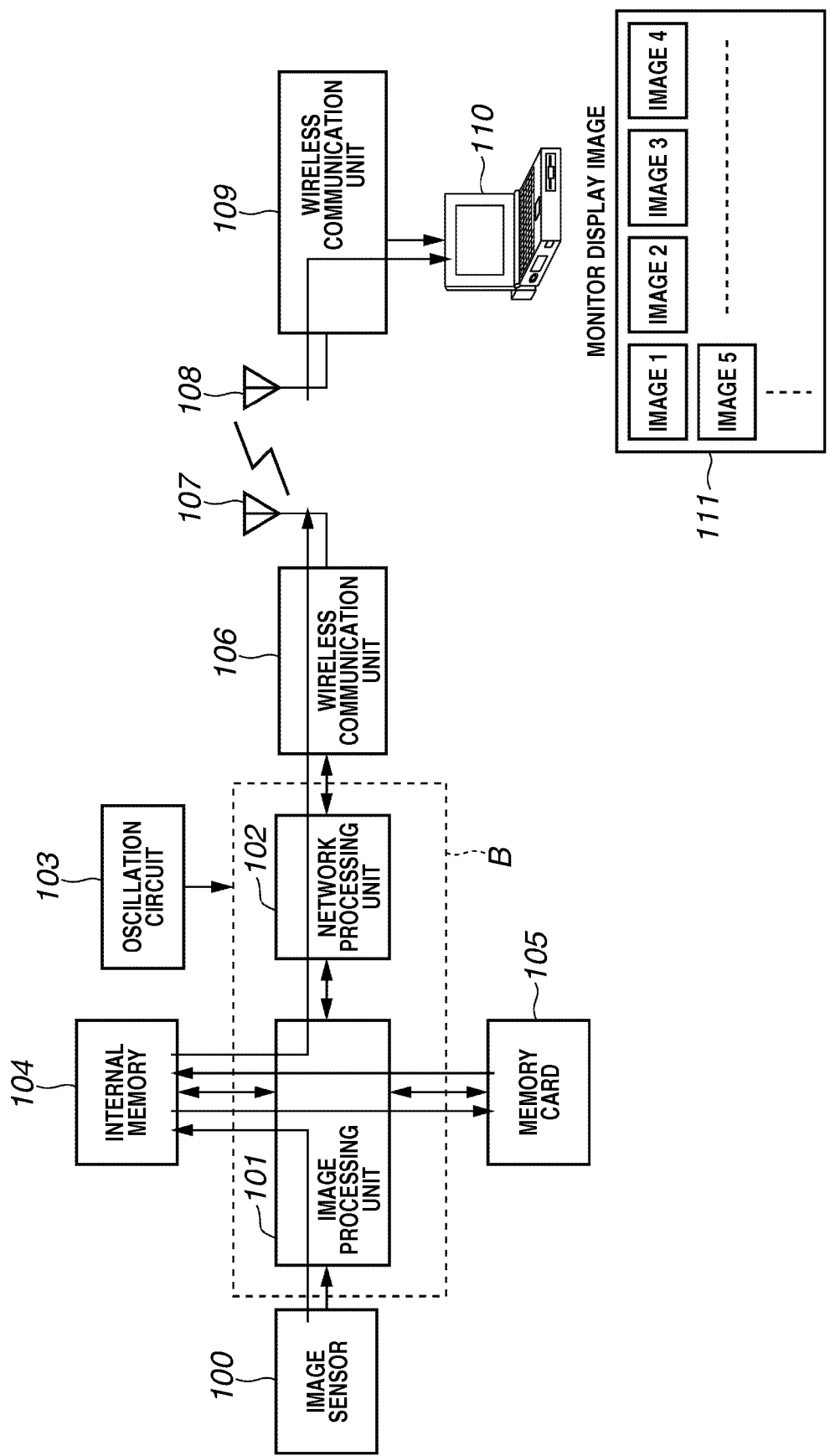
FIG. 7 is a diagram for illustrating an operation of the conventional system.

FIG. 6 illustrates yet another embodiment of the present invention of data transmission between a digital camera and an external device.

The basic operation in the present embodiment is the same as the first described embodiment. In the present embodiment, the communication speed detected by the wireless communication unit 16 is notified to the network process controlling unit 14. In the case where the communication speed is high (becomes higher), the network process controlling unit 14 sends a command to the clock controlling unit 15 to raise the system clock frequency. Furthermore, the network process controlling unit 14 notifies the power source changeover to the voltage controlling unit 21. The voltage controlling unit 21 raises the voltage level supplied to the network process controlling unit 14 and the DSP 6 relatively higher.

This ensures the timing margin which enables an integrated circuit (IC) to operate when the system clock frequency is raised.

In the case where the communication speed is low (becomes lower), the network process controlling unit 14 sends a command to the clock controlling unit 15 to lower the system clock frequency. Furthermore, the network process controlling unit 14 notifies the power source change-over to the voltage controlling unit 21. The voltage controlling unit 21 sets the voltage level supplied to the network process controlling unit 14 and the DSP 6 relatively lower.

According to the configuration of the present embodiment, the operation voltage can be lowered to the limit that ensures the operation when the system clock frequency is lowered. Accordingly, the power consumption can be reduced dramatically compared with the case of merely lowering the clock frequency. The process speed of the network processing unit and the image processing unit, and the power source voltage supplied to the network processing unit and the image processing unit are changed according to the communication speed of the wireless communication unit with the external device. Therefore, power management control can be realized according to the communication speed of the wireless communication unit.

Figure 8:
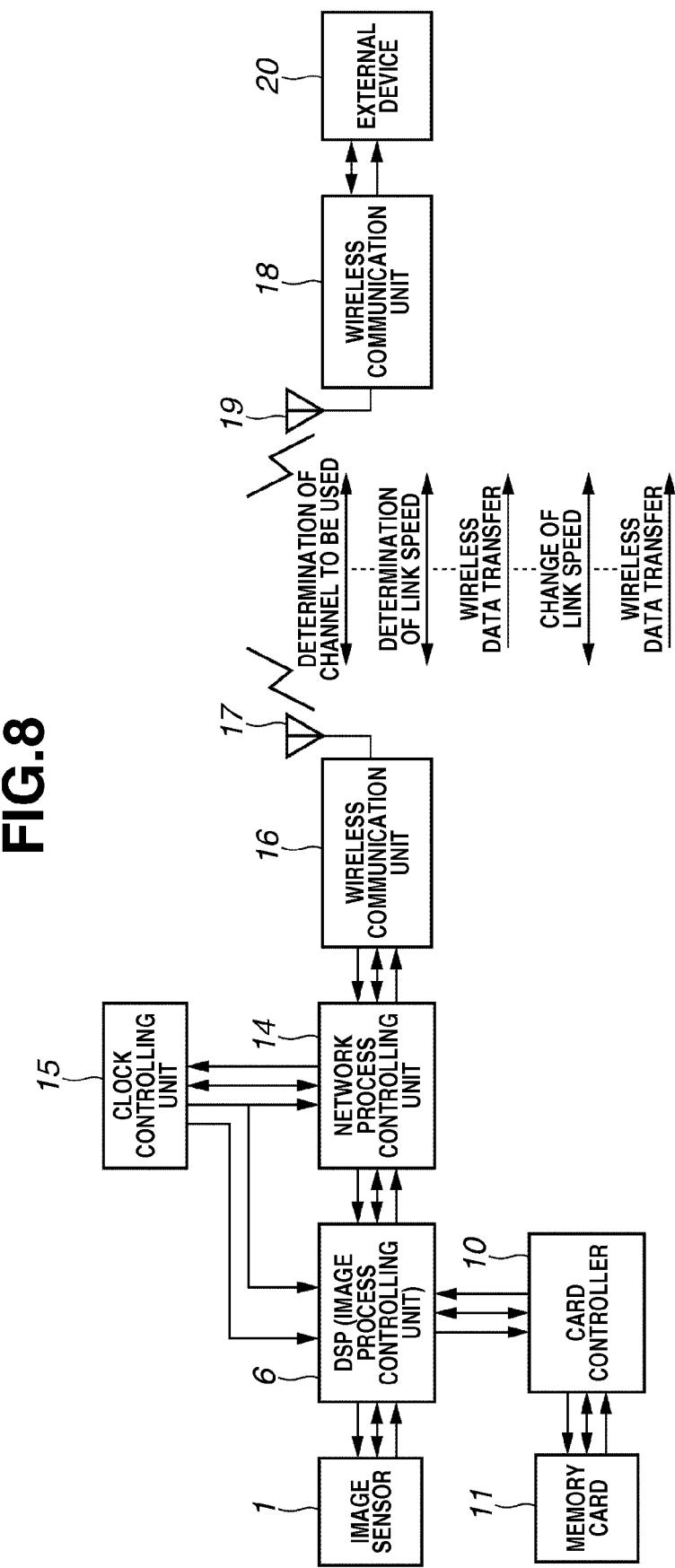
FIG. 8 is a diagram for illustrating a detailed operation of a system according to an embodiment of the present invention.

FIG. 8 illustrates still yet another embodiment of the present invention. The present embodiment has the same basic configuration and operation as the above-described embodiments. The elements having the same function and role as the above-described embodiments have the same reference numerals as in the above-mentioned embodiments. In the present embodiment, the image data is transferred to the external device 20 while capturing images with the image sensor 1.

In one of the above-described embodiments, a digital camera has been described in which the clock frequency of the network process controlling unit 14 configured to convert the transmitting data into the packet data, and the DSP 6 (image process controlling unit) configured to process the image signal is changed according to the wireless communication state.

In the present embodiment, a large amount of image signals is continuously output from the image sensor 1, for example, in a continuous shooting mode in which a plurality of image data continuously is generated. In such a case, if the process speed of the DSP 6 or the network process controlling unit 14 is changed according to the wireless communication state, it is possible that a process speed is not sufficient in applying the image process to the image signal output from the image sensor 1. That is, if the communication speed is changed to a lower one and the clock frequency of the DSP 6 is changed to a lower one when the communication electric wave state is poor, the DSP 6 may not be able to process the image signal output from the image sensor 1.

In particular, in the case of transferring the image data to the external device while capturing images, after executing the color process and the compression process in the DSP 6, the image data is transferred to the network process controlling unit 14. Further, the image data is also transferred to the memory controller 10 in order to record the image data in the memory card 11. In such a case, a large amount of the data should be processed in the DSP 6. Therefore, even if the electric wave state is poor for communication, it is more advantageous to determine the clock frequency of the DSP 6 depending on the data process content in the DSP 6 instead of changing the clock frequency of the DSP 6 to the lower side.

Therefore, in the present embodiment, in the case where a large amount of image data is output from the image sensor 1 at one time as in the continuous shooting mode, the clock frequency of the DSP 6 or the network process controlling unit 14 is changed according to the output of the image signal from the image sensor 1 instead of changing the process speed of the DSP 6 according to the wireless communication state.

When the digital camera 50 is changed over to the continuous shooting mode by a mode changing switch (not shown), the CPU 7 changes the control mode. In the case where the continuous shooting mode is not set, control of a communication speed priority type is performed. That is, the process speed of the network process controlling unit 14 or the DSP 6 is changed according to the communication speed as previously described. However, if the continuous shooting mode is set, control of a process speed priority type is performed. That is, the process speed is determined according to the mode instead of changing the process speed according to the communication speed.

According to the process speed priority type control, the process speed of the image process controlling unit is changed according to the mode set by the user (the number of the continuous shooting and the continuous shooting speed). In the case where the number of the continuous shooting is large or the continuous shooting speed is high, a command to change the clock frequency to a higher speed is sent to the clock controlling unit 15. In the case where the number of the continuous shooting is not so large, or the continuous shooting speed is not so high, the clock frequency is not changed to a higher speed. As to the change of the clock frequency, the CPU 7 stores a table showing the relationship between the number of the continuous shooting or the continuous shooting speed, and the frequency level of the clock. A command to change the clock frequency is sent to the clock controlling unit 15 based on the table.

The clock controlling unit 15 changes the clock frequency of the DSP 6 based on the received change command. At the time, together with the change of the clock frequency of the DSP 6, the clock frequency of the network process controlling unit 14 and the process speed of the network process controlling unit 14 can be changed as well.

Then, the changed process speed of the DSP 6 and the network process controlling unit 14 is provided to the wireless communication unit 16. The wireless communication unit 16 changes the wireless communication speed according to the received process speed so as to transmit the wireless data. The communication speed is changed by changing the modulation method as previously described.

In the case where the communication speed cannot be raised due to a poor sensitivity in receiving electric wave when the communication speed is to be changed, the process speed of the network process controlling unit 14 can be changed depending on the communication state, and the process speed of the DSP 6 can be changed depending on the capturing mode or the content of the data process.

Further, in the case where the communication speed cannot be raised due to a poor sensitivity in receiving electric wave, the user is notified, by the display on the TFT display unit 13, that the data cannot be transferred to the external appliance while the image data is continuously shot. Further, the continuous shooting mode set by the digital camera 50 (the number of continuous shooting and the continuous shooting speed) can be limited according to the electric wave receiving sensitivity so that the process speed and the communication speed can be controlled not to become high.

While the continuous shooting mode has been described in the present embodiment, the present invention is not limited thereto. For example, the present invention can also be applied to a setting for shooting a large size image or to a setting of a special image process such as face detection, image synthesis and sepia photography in which the process by the DSP 6 is intensively increased. In these cases, the clock frequency is determined according to the set image size and the content of the image process.

If the process speed is changed according to the wireless communication state, a process speed sufficient in applying the image process to the image signal output from the image sensor 1 may not be obtained. In such a case, the communication speed priority type control can be changed to the process speed priority type control according to the set shooting mode and the content of the data process, so that optimum performance can be realized in the set mode.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-108794 filed Apr. 11, 2006, which is hereby incorporated by reference herein in its entirety.

What is claimed is:

1. A digital camera comprising:
    an image sensing unit configured to shoot a subject and output an image signal;
    an image processing unit configured to apply an image process to the image signal to produce image data;
    an image recording unit configured to record the image data in a storage medium;
    a network processing unit configured to convert the image data into packet data according to a transfer method to transfer the image data to an external device;
    a wireless controlling unit configured to control wireless communication with the external device to wirelessly transfer the packet data;
    a communication speed controlling unit configured to change a communication speed of the wireless communication; and
    a process speed controlling unit configured to change a process speed of the network processing unit according to the communication speed changed by the communication speed controlling unit.

2. The digital camera according to claim 1, wherein the communication speed controlling unit changes the communication speed by altering a data modulation method according to a receiving sensitivity of the wireless communication or an error ratio of data associated with the wireless communication.

3. The digital camera according to claim 1, wherein the process speed controlling unit changes the process speed of the network processing unit as well as the process speed of the image processing unit according to the communication speed changed by the communication speed controlling unit.

4. The digital camera according to claim 1, wherein the process speed controlling unit changes the process speed of the network processing unit by changing a clock frequency supplied to the network processing unit according to the communication speed changed by the communication speed controlling unit.

5. The digital camera according to claim 1, wherein the process speed controlling unit changes an image data transferring speed for transferring images from the image processing unit to the network processing unit according to the communication speed changed by the communication speed controlling unit.

6. The digital camera according to claim 1, further comprising a voltage controlling unit configured to control a voltage supplied to the network processing unit according to the communication speed changed by the communication speed controlling unit.

7. A digital camera comprising:
    an image sensing unit configured to shoot a subject and output an image signal;
    an image processing unit configured to apply an image process to the image signal to produce image data;
    a network processing unit configured to convert the image data into packet data according to a transferring method to transfer the image data to an external device;
    a wireless controlling unit configured to control wireless communication with the external device to wirelessly transfer the packet data to the external device;
    a process speed controlling unit configured to change a process speed of the image processing unit; and
    a communication speed controlling unit configured to change a communication speed of the wireless communication by the wireless controlling unit according to the process speed of the image processing unit changed by the process speed controlling unit.

8. The digital camera according to claim 7, further comprising a mode setting unit configured to set the shooting mode,
    wherein the process speed controlling unit changes the process speed of the image processing unit according to the shooting mode set by the mode setting unit.

9. The digital camera according to claim 7, further comprising an image process setting unit configured to set the image process executed by the image processing unit, wherein the process speed controlling unit changes the process speed of the image processing unit according to the image process set by the image process setting unit.

10. The digital camera according to claim 7, wherein the process speed controlling unit changes the process speed of the image processing unit by altering a clock frequency supplied to the image processing unit.

11. A digital camera comprising:
an image sensing unit configured to shoot a subject and output an image signal;
an image processing unit configured to apply an image process to the image signal to produce image data;
an image recording unit configured to record the image data in a storage medium;
a network processing unit configured to convert the image data into packet data according to a transferring method to transfer the image data to an external device;
a wireless controlling unit configured to control wireless communication with the external device to wirelessly transfer the packet data to the external device;
a process speed controlling unit configured to determine a process speed of the image processing unit or the network processing unit; and
a setting unit configured to set a shooting mode for the image process in the image processing unit,
wherein the process speed controlling unit can switch between a mode of determining the process speed based on a state of the wireless communication and a mode of determining the process speed based on contents set by the setting unit.

12. The digital camera according to claim 11, wherein the process speed controlling unit changes how the process speed is determined according to contents set by the setting unit.

13. A method for controlling a digital camera comprising:
shooting a subject and outputting an image signal;
applying an image process to the image signal to produce image data;
recording the image data in a storage medium;
converting the image data into packet data according to a transfer method to transfer the image data from the digital camera to an external device;
controlling wireless communication between the digital camera and the external device to wirelessly transfer the packet data from the digital camera to the external device;
changing the communication speed of the wireless communication; and
changing the process speed associated with converting the image data into packet data according to the changed communication speed.

14. A method for controlling a digital camera comprising:
shooting a subject and outputting an image signal;
applying an image process to the image signal to produce image data;
converting the image data into packet data according to a transfer method to transfer the image data from the digital camera to an external device;
controlling wireless communication between the digital camera and the external device to wirelessly transfer the packet data from the digital camera to the external device;
changing a process speed of the image process;
changing a communication speed of the wireless communication according to the changed process speed.

15. A method for controlling a digital camera comprising:
shooting a subject and outputting an image signal;
applying an image process to the image signal to produce image data;
recording the image data in a storage medium;
converting the image data into packet data according to a transfer method to transfer the image data from the digital camera to an external device;
controlling a wireless communication between the digital camera and the external device to wirelessly transfer the packet data from the digital camera to the external device;
setting a shooting mode for the image process;
determining a process speed of the image processor of converting the image data into packet data;
wherein a mode of determining the process speed based on a state of the wireless communication and a mode of determining process speed based on shooting mode can be switched to each other.

* * * * *